United States Patent

Bryant et al.

[15] 3,680,123
[45] July 25, 1972

[54] LUNEBERG LENS ECM APPARATUS

[72] Inventors: Marion B. Bryant; Barry R. Hunt, both of San Diego, Calif.

[73] Assignee: The United States of America as represented by the Secretary of the Navy

[22] Filed: Oct. 9, 1970

[21] Appl. No.: 79,592

[52] U.S. Cl. .......................... 343/113 R, 343/119, 343/123, 343/911 L
[51] Int. Cl. .......................................................... G01s 3/18
[58] Field of Search .................... 343/113 R, 119, 123, 911 L, 343/754

[56] References Cited

UNITED STATES PATENTS 3,060,427  10/1962  Jaffe et al. ........................ 343/113 R X
3,392,394  7/1968  Caballero, Jr. ......................... 343/754

Primary Examiner—Benjamin A. Borchelt
Assistant Examiner—Richard E. Berger
Attorney—R. S. Sciascia, George J. Rubens and J. W. McLaren

[57] ABSTRACT

A Luneberg lens antenna system for ECM applications. A cylindrical Luneberg lens of suitable dimensions is rigidly mounted between a pair of juxtaposed, parallel conducting plates. A selectively predetermined number of feed-horns are mounted and disposed independently of the lens about the periphery of the lens and in close proximity thereto. The antenna system can be combined with an IFM (Instantaneous Frequency Measurement) receiver to provide instantaneous reception of signals and precise and accurate direction-finding of signals over 360° azimuth. The antenna system also features high-gain, narrow beamwidths, low sidelobes, and acceptance of multiple signal polarizations.

6 Claims, 2 Drawing Figures

INVENTOR.
MARION B. BRYANT
BY BARRY R. HUNT

INVENTOR.
MARION B. BRYANT
BY BARRY R. HUNT

LUNEBERG LENS ECM APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

An urgent need currently exists in the Navy for major improvements in the passive electronic warfare capabilities of the surface fleet. This need is made urgent by the ever increasing threat of hostile anti-shipping missiles and their stand-off weapons systems which make it essential that Navy ships be capable of rapidly detecting, analyzing, and responding to threat emissions and overt changes in signal environments. Existing shipboard electronic surveillance systems possess a relatively low probability of detection, cannot perform simultaneous surveillance and analysis functions, and cannot effectively process signals from exotic emitters. Furthermore, existing systems provide relatively inaccurate DF measurements and generally possess response times in the order of several minutes.

SUMMARY OF THE INVENTION

A Luneberg lens antenna system for ECM applications is disclosed. The antenna essentially comprises a cylindrical Luneberg lens that is mounted between two juxtaposed, parallel conducting plates. A selectively predetermined number of feed-horns are disposed in a symmetrical manner about the periphery of the lens and in close proximity thereto whereby plane waves incident upon a section of the lens periphery are focused at a point opposite the section.

The antenna system provides high-gain, narrow beamwidths, low sidelobes, and can accept multiple polarizations. The antenna system produces a multiple beam pattern which can be implemented as a multi-beam direction finder by combining it with appropriate receiving and display apparatus.

OBJECTS OF THE INVENTION

It is an object of the present invention to provide a new and improved Luneberg lens antenna system for passive ECM applications featuring high gain, narrow bandwidths, and minimal sidelobe effects.

It is another object of the present invention to provide a Luneberg lens antenna system which can be used to provide instantaneous reception and accurate direction-finding over 360° azimuth.

Other objects, advantages and novel features of the invention will become apparent from the following detailed description of the invention when considered in conjunction with the accompanying drawings.

DESCRIPTION OF THE PREFERRED EMBODIMENTS

Figure 1:
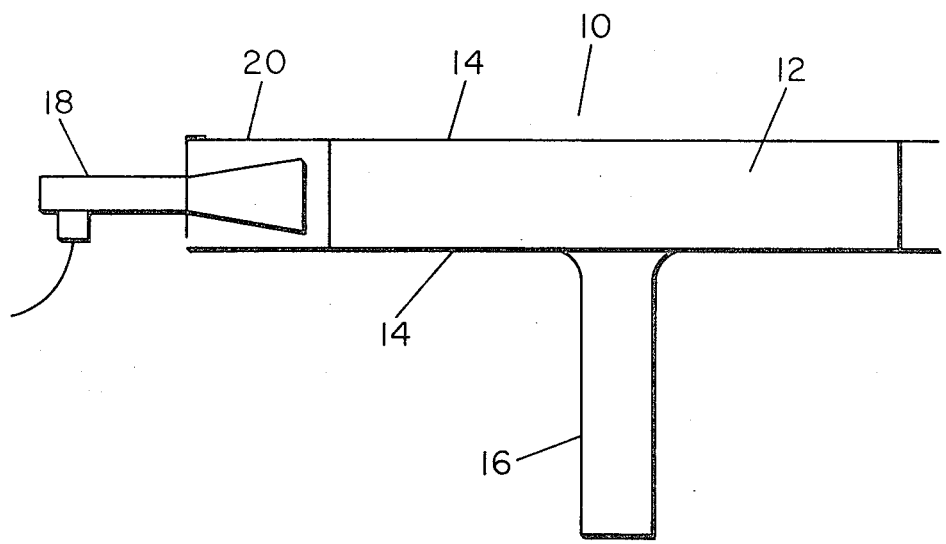
FIG. 1 is a simplified sideview of a Luneberg lens antenna embodying the inventive concept disclosed herein; and, FIG. 2 is a schematic block diagram of a combined Luneberg lens IFM receiver direction finding system.

FIG. 1 is a simplified side view of a Luneberg lens antenna system 10 embodying the inventive concept disclosed herein. The antenna comprises a cylindrical Luneberg lens 12 which is sandwiched between two juxtaposed, parallel conducting plates 14. The lens and the conducting plates can be conveniently supported by means of a mounting stub 16. A selectively predetermined number of microwave feed-horns 18 are symmetrically disposed about the periphery of the lens 12.

The feed-horns can be rigidly mounted about the lens by means of suitable bracket supports 20. The feed-horns are positioned with the open end thereof facing the periphery of the lens but not in contact with the periphery.

The feed-horns 14 collect energy focused by the lens 12 and couple the energy to appropriate receiving apparatus (not shown). The feed-horns exert some influence on the overall response of the system because of their beam pattern and radial position relative to the focus of the lens. A typical feed-horn can comprise a cavity-backed spiral or an E-plane sectoral horn.

The Luneberg lens 12 has an index of refraction n that varies as a function of radial position, $r$, in accordance with the equation $$n = \sqrt{D + r^2}$$

where $D$ is the diameter of the lens. As is well-known, if an electromagnetic plane wave is introduced into the periphery of a Luneberg lens, it is focused at a point on or near the surface of the diametrically opposite side. Thus it can be seen that lens 10 is merely a conventional, circularly symmetric Luneberg lens which has a variable index of refraction which is obtained by employing successive rings of differing dielectric constants.

It should be noted that unobstructed surveillance over 360° can be achieved by vertically stacking three Luneberg lens systems 10. Such a configuration can be used to achieve mast-top or around-the-mast mounting and also to obtain simultaneous surveillance of several different frequency bands by designing the several lenses and feed-horns for different frequency bands.

Extensive testing of the antenna system 10 of FIG. 1 has clearly shown that the system can provide pulse-by-pulse determination of bearing. Consequently, it has been determined that the antenna system can be effectively combined with an instantaneous frequency measurement (IFM) receiver as shown in FIG. 2 to provide an ECM device that can provide an instantaneous broadband frequency-bearing display of emitter activity which is much more useful for ECM purposes than either display by itself.

Figure 2:
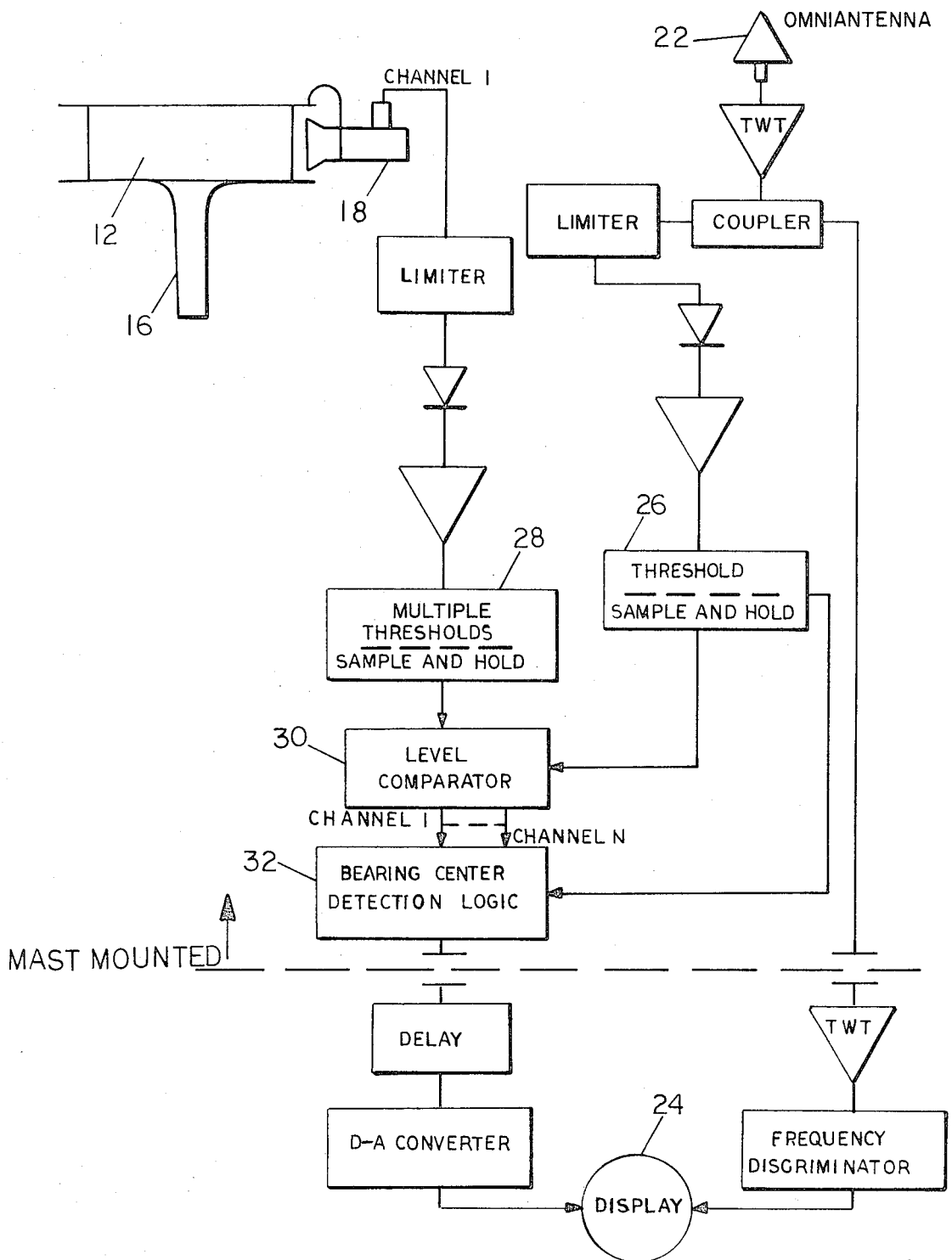

The circuit of FIG. 2 is illustrated using a single antenna system 10. However if 360° coverage is desired, three antenna systems must be used in a vertically stacked manner as previously described and the IFM omni-antenna 22 must be installed central to the lenses whereby a pulse incident upon a lens would also be incident upon the IFM antenna.

The antenna system of FIG. 2 essentially processes in a digital manner each pulse and generates either a digital or an analog voltage proportional to bearing.

Simultaneously, the IFM receiver of FIG. 2 processes its signal data on a pulse-by-pulse basis and generates either a digital or analog voltage proportional to frequency. The two output voltages are then used to drive an appropriate frequency-versus-bearing display device 24.

The IFM receiver provides the operator with a picture of the entire frequency band being monitored based on established IFM techniques. IFM receivers of the type manufactured by the Syracuse Research Corporation and the Stanford Electronic Laboratories can be utilized to advantage in the system of FIG. 2.

In addition to providing frequency data to the display device, the omni-channel device can also be used to derive a signal threshold level by means of the threshold circuit 26. Likewise, threshold circuit 28 multiple can be used to derive a signal threshold level for the outputs of the several directional channels (only one shown) of the lens system. The outputs from the two threshold circuits are compared in the level comparator 30 which passes only those outputs from the directional channels which exceed the level from the omni-channel.

The outputs are applied to bearing center detection logic circuit 32 which selects the center or boresight bearing of the directional channels as the bearing to the source. The selected bearing is then coupled to the display device 24.

It should be understood and appreciated that the system of FIG. 2 can provide instantaneous coverage over an entire frequency band, e.g., 7–11 Hz, without requiring any tuning by an operator.

The omni-channel in the system of FIG. 2 can be used to suppress sidelobe interference by setting the omni-channel threshold level higher than the sidelobes.

Also the omni-channel allows the bearing center detection logic 32 to determine bearing based upon main-bearing responses only. Thus individual threshold ranges in each channel can be much wider, and interference from sidelobe or backlobe signals can be suppressed. The thresholds of the directional channels can be used to indicate signals exceeding minimum desirable signal and to identify channels having high level outputs when strong signals are being received.

The omni-channel can also be used to further narrow the choice of beams before bearing is determined by the bearing logic 32. For example, if eight beams are energized by a signal above the minimum discernible signal and four channels exceed the second threshold, then only the four would be compared to the omni-channel. Only those channels exceeding the omni-threshold would be outputted to the bearing logic 32 for bearing center determination.

Thus it can be seen and appreciated that a new and novel Luneberg lens antenna system for passive ECM applications has been disclosed. The antenna system can be implemented as a multi-beam, passive acquisition direction finder by combining it with appropriate receiving and display apparatus. The antenna system can provide high-gain, narrow beamwidths, low sidelobes, and can process multiple polarizations. Obviously many modifications and variations of the present invention are possible in the light of the above teachings. It is therefore to be understood that within the scope of the appended claims the invention may be practiced otherwise than as specifically described.

What is claimed is:

1. In ECM apparatus, a multi-beam, passive acquisition direction-finder system comprising:

a selectively predetermined number of Luneberg lens antennas operable over a different frequency range for receiving microwave energy;

instantaneous bearing measurement means coupled to the output of each of said antennas for providing a pulse-by-pulse determination of bearing by digitally processing each incident pulse of microwave energy and generating a digital voltage proportional to the bearing of said pulse;

instantaneous frequency measurement means for providing a pulse-by-pulse determination of frequency by digitally processing each incident pulse of microwave energy and generating a digital voltage proportional to the frequency of said pulse; and display means coupled to the outputs of said bearing and frequency measurement means.

2. The system of claim 1 wherein each of said Luneberg lens antennas consists of a cylindrical Luneberg lens rigidly supported between and in contact with two juxtaposed, parallel conducting plates, said antenna further including a selectively predetermined number of microwave feed-horns disposed in a symmetrical manner about the periphery of said lens and in close proximity thereto.

3. The apparatus of claim 2 wherein said microwave feed-horns comprise cavity-backed spirals.

4. The apparatus of claim 3 wherein three Luneberg lens antennas are stacked vertically with respect to each other to obtain unobstructed surveillance over 360°.

5. The apparatus of claim 4 further including omni-channel means for selectively deriving a signal threshold level whereby only incident pulses exceeding said level are coupled to said display means and whereby sidelobe interference is suppressed by selecting a threshold level higher than the expected sidelobes.

6. The apparatus of claim 5 further including means coupled to the output of said omni-channel means for selecting the center or boresight bearing of the incident pulses of microwave energy as the bearing of the source transmitting said microwave energy.

* * * * *